United States Patent [19]
Dijkstra

[11] 3,843,575
[45] Oct. 22, 1974

[54] METHOD OF PRODUCING AN AQUEOUS EMULSION OF A PHENOL FORMALDEHYDE RESOL RESIN SUITABLE FOR IMPREGNATING FIBROUS MATERIAL

[75] Inventor: Rinse Dijkstra, Emmasingel, Eindhoven, Netherlands

[73] Assignee: U.S. Philips Corporation, New York, N.Y.

[22] Filed: Mar. 24, 1971

[21] Appl. No.: 127,785

Related U.S. Application Data

[63] Continuation of Ser. No. 680,357, Nov. 3, 1967, abandoned.

[52] U.S. Cl............... 260/29.3, 156/333, 260/19 R, 260/53 R, 260/57 C
[51] Int. Cl.............................................. C08g 5/20
[58] Field of Search............ 260/53, 57, 29.3, 19 R, 260/38; 156/333

[56] References Cited
UNITED STATES PATENTS
| | | | |
|---|---|---|---|
| 2,151,975 | 3/1939 | Kline | 260/53 |
| 3,013,916 | 12/1961 | Boiney et al. | 260/53 |

FOREIGN PATENTS OR APPLICATIONS
| | | |
|---|---|---|
| 1,011,369 | 11/1965 | Great Britain |

*Primary Examiner*—Donald E. Czaja
*Assistant Examiner*—William E. Parker
*Attorney, Agent, or Firm*—Frank R. Trifari; Norman N. Spain

[57] ABSTRACT

Method of reacting phenol with an excess of formaldehyde in an aqueous medium to produce a resol resin for the impregnation of paper. The reaction is carried out in the presence of about 1 part of nitrogen bases containing tertiary amino groups and from about 2.5 to 3.5 parts of nitrogen bases containing primary or secondary amino groups.

3 Claims, No Drawings

METHOD OF PRODUCING AN AQUEOUS EMULSION OF A PHENOL FORMALDEHYDE RESOL RESIN SUITABLE FOR IMPREGNATING FIBROUS MATERIAL

This application is a continuation of Ser. No. 680,357 filed 11/03/67 which is now abandoned.

The invention relates to a method of producing an aqueous emulsion of a phenol formaldehyde resol resin suitable for impregnating fibrous materials such as paper by reacting phenol in water with an excess quantity of formaldehyde in the presence of organic bases containing amino-groups.

From sheets of paper impregnated with such a resol resin a paper-based laminate can be manufactured which may serve as a support for printed wiring. For this purpose sheets of paper are impregnated and dried and the resin contained in the paper is precondensed; a stack of a number of these impregnated paper sheets in which the resin has been precondensed is then if desired, covered with a metal foil and with the interposition of an adhesive layer between the metal foil and the stack, the assembly so formed is compressed, whilst heated, to form a single unit.

When employed, as a support for printed wiring the paperbased laminate has to satisfy severe electrical requirements. Even after being immersed for 24 hours in water at 20°C, the electrical properties must not have changed markedly. This means that the electrolyte content, the mobility of the ions contained therein, and the water absorption capacity of the material must be low.

In principle two kinds of methods are known for the production of resol resins from monohydroxy benzene compounds, such as phenol or cresol condensed with formaldehyde:

1. the method in which the basicity of the reaction mixture is controlled by ammonia or organic bases derived therefrom, in which one or two hydrogen atoms of ammonia are replaced by an alkyl- or an aryl-group. The organic bases may contain one or more primary or secondary amino-groups or both.

2. The method in which the basicity of the reaction mixture is controlled by inorganic basic substances, with organic bases containing solely tertiary amino groups or with quaternary ammonium bases.

In the first case the resin contains little or no electrolyte. However, the pH value of the reaction mixture drops during the reaction because ammonia and organic bases containing primary and secondary amino groups are incorporated in the resin and react with formaldehyde. If the reaction is not slowed down, in due time, high molecular weight products are formed so that the resultant resin is less suitable for impregnating cellulose-based material, for example, paper. It appears, in practice, that the formation of high molecular weight resin molecules can be avoided only with difficulty and continues even after deceleration of the reaction by cooling. Consequently the pot life of the aqueous emulsions of such resins is short. The resins are hydrophobic since they only contain a few free methylol groups. Therefore difficulties may arise in impregnating paper since the resin tends to settle on the paper surface without penetrating into the pores. Resins obtained using this type of bases are usually employed in alcoholic solutions for impregnating fibrous materials such as paper.

In the second case hydrophilic resins are obtained, which are very suitable for impregnating paper. The resin emulsion is usually sufficiently stable. However, the resin emulsion contains free electrolyte, so that the electrical properties of the material impregnated with this emulsion are adversely affected.

In itself the hydrophilic nature of the resin is advantageous for the impregnation. However, the paper based laminate thus produced has to be preferably as little hydrophilic as possible, which means that its water absorption has to be at a minimum. This may be achieved by reducing the pH value of the resin emulsion immediately before use. For this purpose, however, a quantity of electrolyte has to be added to the resin emulsion so that the electrical properties of the paper-based laminate produced by means of this emulsion are adversely affected. This undesirable effect may be partly avoided by reducing the pH-value by acids forming salts having only a slight ion mobility with the bases contained in the resin emulsion. In this way paper-based laminate having fairly satisfactory electrical properties can be obtained.

The invention has for its object to provide a method of producing an aqueous emulsion of a phenol formaldehyde resol resin, in which the advantages of the two aforesaid methods are combined and the disadvantages are avoided completely or at least to a high extent.

During research work leading to the present invention it was surprisingly found that in the method of producing the phenol formaldehyde resol resin with the aid of a tertiary amine a considerable portion of the tertiary amine may be replaced by organic bases having primary or secondary amino groups or both without sacrificing the stability of the aqueous emulsion of the impregnating resin.

It was found that in this respect favourable results were obtained by choosing a ratio of the tertiary amino groups to the total primary and/or secondary amino groups in the range from 1 : 2.5 to 1 : 3.5. With a ratio of less that 1 : 3.5 the emulsion becomes unstable and with a ratio higher than 1 : 2.5 the electrolyte content increases so that the properties of the resin are less satisfactory.

The method of producing an aqueous emulsion of a phenol formaldehyde resol resin according to the invention is characterized in that the reaction between phenol and formaldehyde is carried out in an aqueous medium containing organic nitrogen bases having tertiary amino groups and bases having primary and/or secondary amino groups, the ratio of the tertiary amino groups to the total primary and/or secondary amino groups, lying between 1: 2.5 and 1 : 3.5.

It should be noted that in this specification and in the claims, the term phenol is to include also alkylated phenols, such as m- and p-cresols.

A stable emulsion is obtained in using the mixture of bases in the production of an aqueous emulsion of a phenol formaldehyde resol resin. In this emulsion no condensation reaction accompanied by the forming of a resinous gel occurs. In the event that the resin settles the emulsion is easily reformed by stirring. The resin emulsions have a very satisfactory impregnating capacity. Paper-based laminates obtained manufactured using an impregnating resin according to the present invention, exhibit low water absorption and improved dielectric and electric properties as compared with paper-based laminates obtained made by using impregnating resins for which only one of the abovementioned two types of basic substances has been employed.

If in the method according to the present invention, the tertiary amine is replaced wholly or partly by quaternary ammonium bases, or basically reacting inorganic compounds, such as hydroxides and carbonates of alkali- and alkaline earth metals, impregnating resins are obtained by means of which paper-bases laminates can be produced. Such laminates were found to have less satisfactory electrical properties than the paperbased laminates obtained by carrying out the method according to the invention.

The primary or secondary amines may be formed by organic substances which contain one or more primary amino groups or one or more secondary amino groups, or as the case may be, by organic substances containing primary and secondary amino groups, these substances being soluble in the reaction mixture and being preferably not less basic than ammonia, that is to say, pK of the base $\leq 5$ at 20°C. In the scope of this invention also $NH_3$ is included with the primary amines.

Examples of materials which may be used as primary or secondary amines in a method according to the present invention are ammonia ($NH_3$), ethylamine, isobutylamine, tertiary-butylamine, cyclohexylamine, ethanolamine, diethylamine, diisopropylamine, diethanolamine, piperidine, methylpyrrolydine, morpholine, ethylenediamine, hexamethylenediamine, piperazine, diethylenetriamine, triethylenetetramine, guanamidine.

As tertiary amines those organic substances may be employed which contain one or more tertiary amino groups and which dissolve in the reaction mixture and which are preferably not less basic than ammonia, that is to say pK of the base $\leq 5$ at 20°C.

Examples of suitable amines are trimethylamine, triethylamine, triisobutylamine, triethanolamine and diethylcyclohexylamine.

Organic compounds containing both primary and/or secondary and tertiary amino groups may also be used if the aforesaid ratio of the tertiary amino groups to the total primary and/or secondary amino groups on is maintained in the mixture of the bases. It is desirable both for the tertiary amino groups and for the primary and/or secondary aminogroups to have the aforesaid basicity. It will be noted that the use of aliphatic primary, secondary and tertiary amines is known for providing a basic medium in the production of resins from monohydroxybenzene compounds with formaldehyde. It is sometimes remarked in the relevant literature concerned that mixtures of two or more of such amines may be used, there being, however, no ultimate rules being given therein for the composition of such a mixture. Moreover the present invention is engaged in producing aqueous emulsions, in the relevant literature, i.e., U.S. Pat. No. 3,013,916 the resins after manufacture are vacuum dehydrated and dissolved in an organic solvent to provide an impregnating resin solution. The present invention is based on the recognition of the fact that by a definite choice of the constituents of the mixture of bases in the correct ratio for the production of an aqueous emulsion of a resol from phenol or an alkylated phenol and formaldehyde a resin emulsion for impregnating paper can be obtained, these emulsions were found to be satisfactory for the manufacture of paper based laminates.

For preparing the impregnating resins according to the invention, it is preferred to use a minimum quantity of nitrogenbase mixture in order to minimize the electrolyte content of the impregnating resin. On the other hand the quantity of bases should not be so small that the time of production of the impregnating resin would be uneconomically prolonged.

Optimum results are obtained by means of base mixtures containing from 0.003 to 0.02 g.at. of nitrogen per gm.molecule of phenol.

In the production of the impregnating resins, for example, from 1.15 to 1.35 g.mol. of formaldehyde per gm-molecule of phenol may be used.

The aqueous emulsion of the resin may be produced as follows.

A reaction vessel provided with an agitator and a reflux condenser closed by a tube filled with soda-lime (a mixture of sodium oxide and calcium oxide to bind $CO_2$ from the air) is filled with X gm molecules of phenol, 1.25 × X gm molecules of formaldehyde and water up to a total water content of about 20 percent by weight. To this mixture is added, a base mixture, for example, containing 0.01 × X gm atoms of nitrogen, for example 0.0075 × X gm atoms of nitrogen in the form of primary and secondary amino groups and 0.0025 × X gm atoms of nitrogen in the form of tertiary amino groups. Whilst stirring the mixture is heated to boiling temperature at which the reaction mixture is maintained for 40 to 60 minutes. Then, if desired, release agents such as cetylalcohol or stearamide may be added, however, preferably at the end of the boiling period.

Then whilst stirring, the mixture is cooled to room temperature. The reduction of the pH value of the reaction mixture may be carried out after the temperature of the reaction mixture is lowered to some extent, preferably by means of an acid that can be incorporated in a resin for example aminosulphonic acid, sulphanilic acid, m-cresotinic acid, suitable quantities are 1 to 2 gm.equivalents of acid per gm.molecule of tertiary amine employed. By acidifying the resin the paper-based laminate produced by means of this resin is only hydrophilic to a small extent and since the acids can be incorporated the ions in the resin have little mobility.

The resultant aqueous emulsions according to the present invention were found to be stable and after standing for over a fortnight at 20°C, they were still usable. If desired, lower alcohols, such as isopropanol or butanol may be added to the emulsions.

Moreover, to the emulsions manufactured according to the invention there may be added substances which ensure that the paper-based laminate produced by means of this impregnating resin can be readily punched at room temperature.

One suitable addition was found to be a substance consisting of hydroxymethylated diphenylolpropane etherified with butanol and modified by ricinus oil. This substance is commercially available. In order to obtain a satisfactory punchability in the cold state a certain minimum quantity of this substance is required, but in order to obtain satisfactory electric properties, a given minimum content of the phenol formaldehyde resol resin is required. When using a mixture of about 9 parts of the abovementioned addition and about 10 parts of the resin the two objectives may be attained.

With reference to the following examples the method according to the invention may be described in detail.

In the examples with a gm.equivalent of a nitrogen base an amount of such a base is meant as will contain a gm.atom of nitrogen.

EXAMPLE I

Stable phenol formaldehyde impregnating resin emulsion

The reaction vessel closed with a plug provided with an agitator, a thermometer and a reflux condenser is used for this production. During the process the reflux condenser is fitted at the top with a tube containing soda lime. The following mixture is introduced into the vessel.

40 gm.molecules of phenol in the form of 4192 gms of aqueous, liquid, technical phenol, 48 gm.molecules of formaldehyde in the form of 1844 gms of 78 percent formaldehyde (the balance being water and 4 percent methanol), 0.075 gm.molecules that is 0.3 gm.equivalent or 20.95 gms of triethylenetetramine, 0.1 gm.molecules that is 0.1 gm.equivalents or 10.1 gms of triethylamine, 200 gms of water.

The mixture is heated until it boils while stirring, and was kept of this temperature for 45 minutes. To the mixture is then added 0.6 gm.molecules that is 170 gms of stearamide. The mixture is cooled down to 80°C within 10 minutes after which cooling is accelerated, stirring being continued. When the temperature of the reaction mixture is about 50°C, 0.1 gm.equivalents of aminosulphonic acid in the form of 67 cc of an 1.5 molar solution in water is added. Cooling is continued down to room temperature while stirring. The aqueous impregnating resin emulsion thus obtained is stable and even after two weeks at room temperature it can still be used for impregnating paper in the production of paper-based laminates.

EXAMPLE II

Stable cresol formaldehyde impregnating resin emulsion

An apparatus of the type described in example I is filled with 10 gm. molecules of cresol 50–55 (a mixture of technical m- and p-cresol containing from 50 to 55 percent m-cresol) being 1090 gms, 11.25 gm.molecules of formaldehyde in the form of 432 gms of a 78 percent formaldehyde solution in water as in example I, 0.006 gm.molecules (0.024 gm.equivalents) of triethylene tetramine, that is 0.876 gms, 0.008 gm.molecules (0.008 eg) of triethylamine that is 0.808, 190 gms of water.

The mixture is heated to boiling temperature and is kept at this temperature with continued stirring this temperature for 45 minutes. Then 0.15 gm.molecules that is 42.5 gms of stearamide were added and the mixture is cooled to 80°C within 10 minutes. Cooling is then continued and when the temperature has dropped below 50°C, 0.009 gm.equivalents of aminosulphonic acid in the form of 6 cc of 1.5 molar solution in water is added, after which, while stirring, cooling is continued down to room temperature. The resultant impregnating resin emulsion is stable.

EXAMPLE III

Production of impregnating resin for the manufacture of paper-based laminate that can be punched in the cold state An apparatus of the kind described in example I is filled with: 40 gm.molecules of phenol that is 4,192 gms of aqueous liquid technical phenol, 50 gm.molecules of formaldehyde that is 1,920 gms of a 78 percent formaldehyde solution in water as indicated in example I, 0.3 gm.equivalents of triethylenetetramine that is 10.95 gms, 0.1 gm.equivalents of triethylamine that is 10.1 gms, 249 gms of water. Whilst stirring the reaction mixture is heated to boiling temperature at which temperature it is kept for 40 minutes under reflux. Then 0.4 gm.molecules that is 113.3 gms of stearamide is added and whilst stirring the mixture is cooled to 80°C within 10 minutes after which cooling is accelerated. When the temperature of the reaction mixture is about 50°C 0.16 gm.equivalents of aminosulphonic acid that is 104 cc of 1.5 molar solution in water is added.

After homogenisation, whilst stirring continuously, 6,135 gms. of Durophen 60 % is added (Durophen is a product of Chemische Werke Albert Wiesbaden and described in K. Hultzsch, Chemie der Phenolharze-Springer-Verlag 1950, pages 150–152. If the content solids of the commercial product exceeds 60 percent by weight which is usually the case, it is previously reduced to 60 percent by means of n-butanol. This Durophen consists of a solution of hydroxymethylated diphenylol propane etherified by butanol and modified by castor oil in a xylene butanol mixture,) that is 90 gms of Durophen 60% per 100 gms of the aforesaid phenol formaldehyde impregnating resin. Cooling is continued to room temperature. Paper-based laminate obtained by this impregnating resin can be punched at room temperature.

The impregnating resin emulsions of the preceding examples I to III are suitable for the manufacture of paper-based laminated. The manufacture of the paper-based laminates indicated in Table I is performed in a conventional manner which means that paper strips are impregnated at room temperature with the impregnating resin emulsion, the strips then being dried in a tunnel furnace at temperatures of about 160°C, the resin being precondensed to a certain extent in the paper. The temperature and the time spent in the furnace are controlled so that when it leaves the furnace the impregnated material has a suitable yield point for compression.

In all cases the paper used to form the laminate was a 90 gms/sq.metre Kraft-paper and a stack of from 10 to 12 sheets of impregnated paper was compressed to form a single body which was about 1.5 mms thick.

The pressure applied was 60 kgs/cm², but other pressures, preferably higher pressures are also suitable. The temperatures used during compression were 145°C and 160°C.

The water absorption capacity of the resultant laminates was determined. For this purpose, test plates were dried at 110°C for 1 hour and then placed in water of 20°C for 24 hours. The water absorption was determined in percent by weight. The results are mentioned in the following table 1.

Table 1 gives furthermore a survey of the electric properties. All dielectric and electric data relate to measurements carried out on the hardpaper after having been kept in water of 20°C for 24 hours. Immediately after the water treatment, the measurements are carried out. The superficially moisture was removed from the laminates by wiping with filter paper.

TABLE 1

|  |  | Impregnating resin Example I | | Impregnating resin Example II | | Impregnating resin Example III |
|---|---|---|---|---|---|---|
| Production hardpaper: | | | | | | |
| Temperature in °C during compression | | 145 | 160 | 145 | 160 | 160 |
| Time of compression in minutes | | 30 | 20 | 40 | 20 | 60 |
| Pressure in kg/cm$^2$ | | 60 | 60 | 60 | 60 | 60 |
| Resin content of the ready hardware in % by weight | | 55 | 58 | 52 | 52 | 55 |
| Thickness hardpaper in mms | | 1.47 | 1.53 | 1.45 | 1.47 | 1.43 |
| Electric properties at 20° after 24 hours stay in water | | | | | | |
| Tan $\delta \times 10^4$ | 100 cs | 313 | 171 | 284 | 273 | 423 |
|  | 1000 cs | 237 | 132 | 208 | 182 | 368 |
|  | 2 Mcs | 353 | 379 | 342 | 368 | 460 |
| Dielectric constant | | | | | | |
| $\epsilon$ at | 100 cs | 5.4 | 5.4 | 5.1 | 5.3 | 5.7 |
|  | 1000 cs | 5.2 | 5.2 | 4.9 | 5.2 | 5.4 |
|  | 2 Mcs | 4.6 | 4.7 | 4.4 | 4.6 | 4.4 |
| Resistivity in $\Omega$ cm | | $3.3 \times 10^{13}$ | $1.3 \times 10^{14}$ | $7 \times 10^{13}$ | $5.2 \times 10^{13}$ | $2.0 \times 10^{13}$ |
| Water absorption in water of 20°C in 24 hours in percentage by weight | | 0.60 | 0.35 | 0.55 | 0.60 | 0.70 |

Table II

|  |  | Impregnating resin A | Impregnating resin B |
|---|---|---|---|
| Production hardpaper: | | | |
| Temperature in °C during compression | | 160 | 160 |
| Time of compression in minutes | | 20 | 20 |
| Pressure in kg/cm$^2$ | | 60 | 60 |
| Resin content of the ready hardpaper in % by weight | | 52 | 54 |
| Thickness of hardpaper in mms | | 1.30 | 1.49 |
| Electric properties at 20°C after 24 hours stay in water | | | |
| tan $\delta \times 10^4$ | 100 cs | 765 | |
|  | 1000 cs | 357 | 560 |
|  | 2 Mcs | 462 | 462 |
| dielectric constant | | | |
| $\epsilon$ at | 100 cs | 6.8 | |
|  | 1000 cs | 6.3 | |
|  | 2 Mcs | 5.4 | |
| Specific resistivity in $\Omega$ cm | | $2.4 \times 10^{12}$ | $3.8 \times 10^{12}$ |
| Water absorption in water of 20°C in 24 hours in percentage by weight | | 1.1 | 0.70 |

By way of comparison table II gives the corresponding properties for two types paper-based laminates A and B obtained by means of an impregnating resin produced with a mixture of only primary and secondary amines, and an impregnating resin produced with a tertiary amine. Resin A was produced from 524 gms of technical phenol (=5 gm.molecules), 295.5 gms of 78 percent by weight of formaldehyde, as in example I, (=6.75 gm.molecules) 3.65 gms of triethylenediamine (=0.025 gm.molecules = 0.1 gm.equivalents) and water (50 gms).

The mixture was boiled for 45 minutes and then 21.25 gms of stearamide were added. After cooling an unstable impregnating resin emulsion was obtained. Resin B was produced from 733.6 gms of technical phenol (=7 gm. molecules), 704.4 gms of formaline (37 percent by weight solution of formaldehyde in water) (8.75 gm.molecules), 7.07 gms of triethylamine (that is 0.07 gm.equivalents). The mixture was boiled for 60 minutes. In vacuo at 80°C 390 ccs were distilled off after which, whilst stirring 29.9 gms of stearamide was added. After cooling 0.07 gm.equivalents aminosulphonic acid was added (46.7 ccs of a 1.5 molar solution in water). The resultant impregnating resin is a stable emulsion.

When comparing Tables I and II it appears that by means of the resins according to the invention the paper-based laminates obtained have better electrical properties than laminates made rising emulsions A or B. A further advantage of the method according to the invention consists in that the resultant impregnating resins are stable emulsions.

I claim:

1. In the method of producing an aqueous emulsion of a phenol formaldehyde resin, particularly adapted for the impregnation of fibrous material, by reacting phenol in water with an excess of formaldehyde in the presence of organic bases containing amino groups or ammonia, the improvement which comprises carrying out the reaction between the phenol and the formaldehyde in an aqueous medium in which the only bases present are organic nitrogen bases containing tertiary amino groups selected from the group consisting of trimethylamine, triethylamine, triisobutylamine, triethanolamine and diethylcyclohexylamine, organic nitrogen bases containing secondary amino groups of up to and including 6 carbon atoms and nitrogen bases selected from the group consisting of ammonia and organic nitrogen bases containing primary amino groups of up to and including 6 carbon atoms, the ratio of the number of tertiary amino groups to the number of the other amino groups and ammonia lies between 1:2.5 and 1:3.5, the pK of the nitrogen bases is $\leq 5$ at 20°C and wherein said bases are soluble in the reaction mixture.

2. The method of claim 1 wherein such a quantity of the base is added that for each gram mole of phenol in the reaction mixture 0.003 to 0.02 gram atoms of nitrogen is present.

3. The method of claim 1 wherein after the termination of the reaction between the phenol and the formaldehyde 1 to 2 gram equivalents of an acid per gram mole of the tertiary amine is added to the reaction medium to neutralize the basic substance present in the reaction medium.

* * * * *

PO-1050
(5/69)

UNITED STATES PATENT OFFICE
CERTIFICATE OF CORRECTION

Patent No. __3,843,575__　　　　　　　Dated_____October 22, 1974

Inventor(s) __RINSE DIJKSTRA__

It is certified that error appears in the above-identified patent and that said Letters Patent are hereby corrected as shown below:

In the title sheet there should be inserted:

-- [30] Foreign Application Priority Data

Nov. 5, 1966 Netherlands 6,615,658 --.

Signed and sealed this 1st day of July 1975.

(SEAL)
Attest:

RUTH C. MASON
Attesting Officer

C. MARSHALL DANN
Commissioner of Patents
and Trademarks